July 7, 1936.   P. N. JARBOE   2,047,072
GAS MIXER
Filed Feb. 16, 1935   2 Sheets-Sheet 1

Inventor
Preston N. Jarboe
By Geo. P. Kimmel
Attorney

July 7, 1936. P. N. JARBOE 2,047,072
GAS MIXER
Filed Feb. 16, 1935 2 Sheets-Sheet 2

Inventor
Preston N. Jarboe
By Geo. S. Kimmel
Attorney

Patented July 7, 1936

2,047,072

UNITED STATES PATENT OFFICE 2,047,072

GAS MIXER

Preston N. Jarboe, San Antonio, Tex.

Application February 16, 1935, Serial No. 6,895

1 Claim. (Cl. 48—180)

This invention relates to a gas mixer designed primarily for supplying propane gas to internal combustion motors of airplanes, but it is to be understood that a gas mixer, in accordance with this invention, may be employed in any connection for which it may be found applicable, and the invention has for its object to provide, in a manner as hereinafter set forth, new and novel means for the utilization of propane gas as a constituent of a combustible mixture for power generation whereby its use may be had without changing the construction of the motor to be supplied with the gas other than substituting the said means for the carburetor of the motor.

A further object of the invention resides in the providing of means, in a manner as hereinafter referred to, to enable the satisfactory use of propane gas as a combustible mixture for driving purposes resulting, when used, in the elimination of carbon monoxide gas; the reduction of the formation of carbon to a minimum; the increase of the cruising radius in about a five to one ratio with respect to the use of gasoline, as one gallon of propane gas is the power equivalent of two and one-half to three gallons of gasoline; the decrease of the operating costs with respect to that entailed by the use of gasoline and materially less weight than gasoline enabling an airplane to carry a greater pay load.

To the above ends essentially and to others which may hereinafter appear, the invention consists of such parts and such combination of parts which fall within the scope of the invention as claimed.

In the drawings:

Figure 4 is a diagrammatical view upon a small scale showing, by way of example, the adaptation of the gas mixer with respect to the motor of an airplane.

Referring to Figure 4 of the drawings which shows, by way of example, the adaptation of the propane gas mixer, in accordance with this invention, with respect to an airplane, 5 indicates the fuselage of an airplane, 6 a tank containing the propane gas, 7 the intake manifold of an internal combustion engine (not shown), 8' the gas supply line leading to the intake manifold 7, 8 the gas feed line leading from the tank, 9 the adapter, in accordance with this invention, which is coupled with the supply and feed lines, 9' a throttle control, 10 a throttle valve forming an element of the adapter, 11 a controllable air inlet means forming an element of the adapter, and 12 a link for operating the said valve and means in unison. The tank 2 is provided in its outer end with a pair of fuse plugs 12' fusible at 165° F. and the said outer end is also provided with a pressure plug 12" of 1500 lbs.

Figure 1:
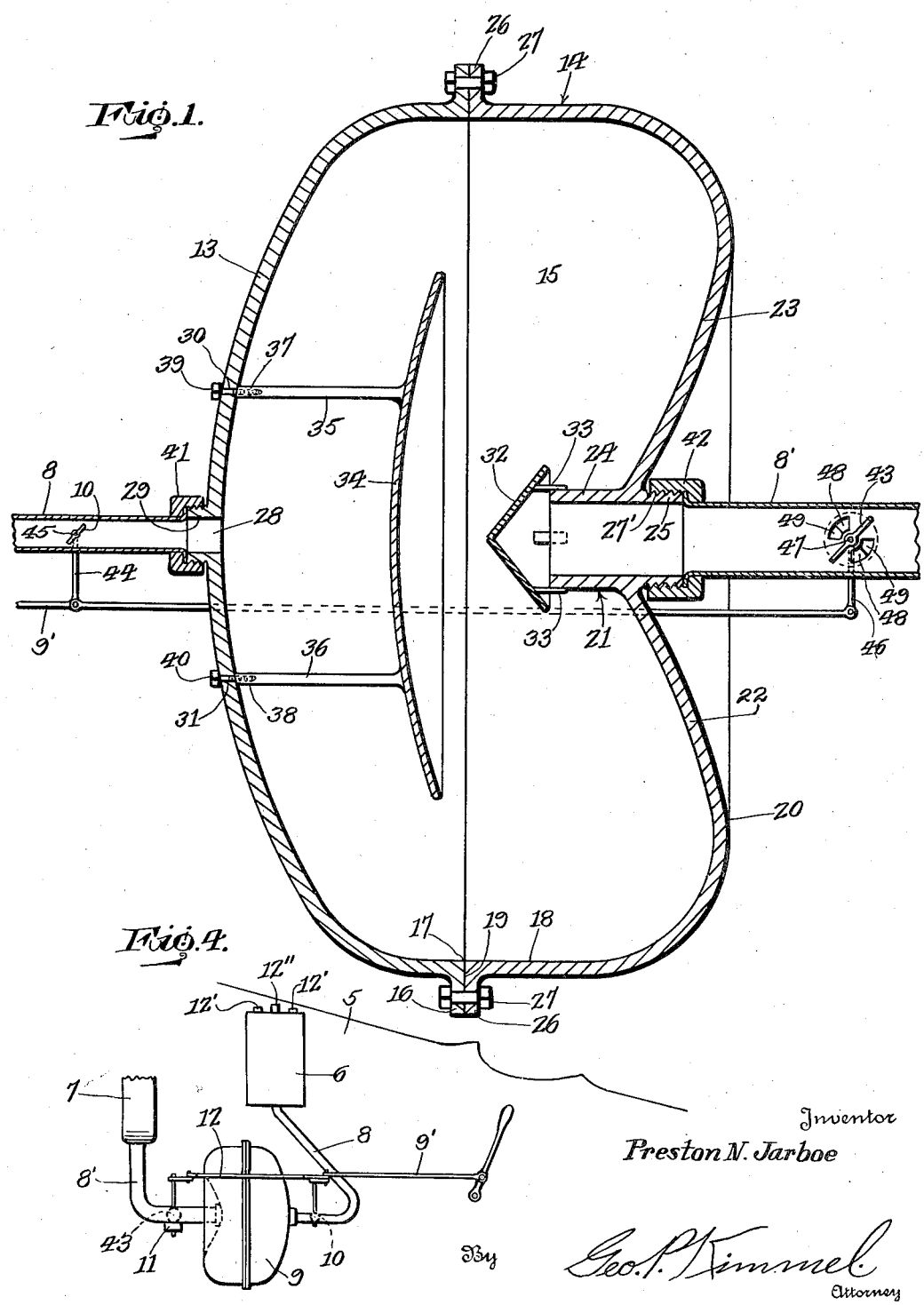
Figure 1 is a vertical sectional view of the gas mixer.
Figure 2:
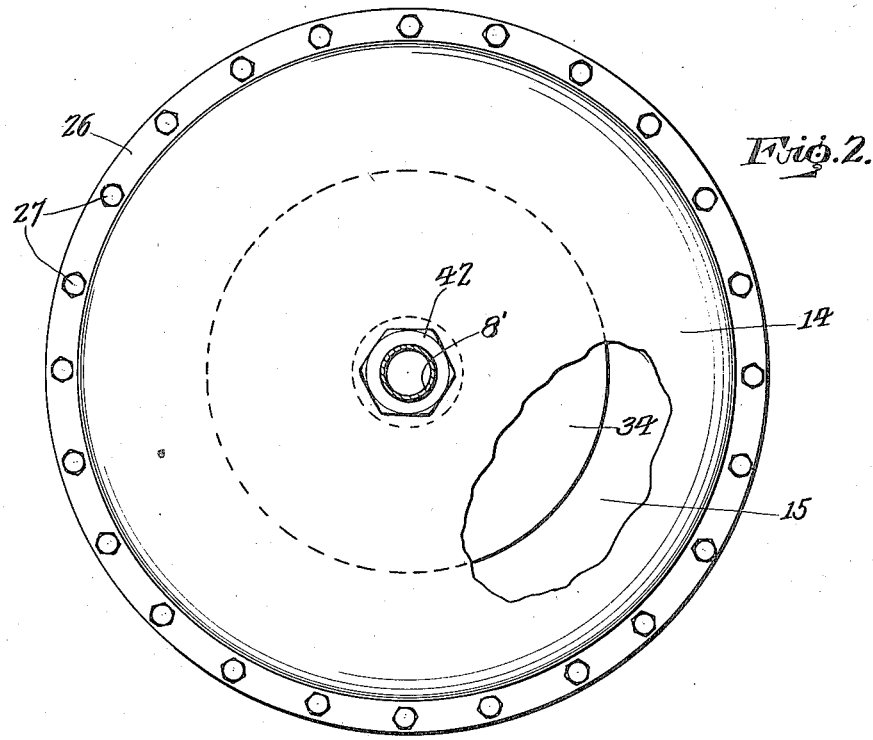
Figure 2 is an elevation looking towards one end of the gas mixer.
Figure 3:
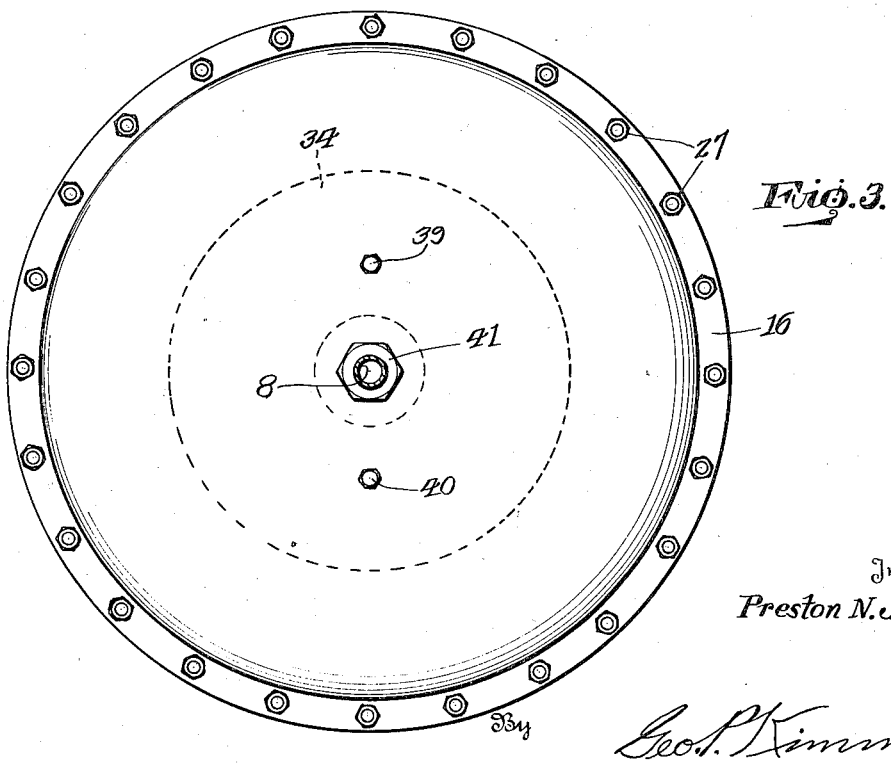
Figure 3 is a view similar to Figure 2 looking towards the other end of the gas mixer.

With reference to Figures 1, 2 and 3, the adapter 7 comprises an annular housing set-up from a pair of oppositely disposed sections 13, 14 to provide an expansion chamber 15 for the propane gas when the latter is supplied thereto. The section 13 is of dome-shaped contour in transverse and horizontal section, having its outer end closed and its inner end open. The inner end of section 13 is formed with an outwardly directed endless apertured flange 16 flush with its inner end edge 17. The section 14 is hollow and includes an annular inner part 18. The free edge 19 of part 18 abuts and is flush with the edge 17 of section 13. The section 14 also includes an outer end part 20 formed centrally with a sleeve 21 and a pair of oppositely disposed like portions 22, 23. The portion 22 or the portion 23, in vertical section, is formed of an outer stretch upon an outwardly directed curve and an inner stretch of greater length than said outer stretch, upon an inwardly directed curve. The arc of the inner stretch is greater than the arc of the outer stretch. In vertical section the portion 22 or 23 appears as of semi-pear shaped outline. The outer stretches of the portions 22, 23 at their outer ends merge into the part 18. The inner stretches of portions 22, 23 extend inwardly towards and merge at their inner ends into the outer periphery of sleeve 21 intermediate the ends thereof whereby sleeve 21 will be formed with an inner portion 24 and an outer portion 25. The points of mergence of the inner stretches with the sleeve 21 substantially align with the points of mergence of the outer stretches with the part 18. The section 14 is formed with an outwardly directed endless apertured flange 26 which abuts the flange 16. The flanges 16, 26 are anchored in abutting engagement by the holdfast means 27. The sleeve 21 is open at each end. The portion 24 of sleeve 21 is arranged in chamber 15 and is of greater length than the portion 25. The latter is provided with peripheral threads 27' for a purpose to be referred to. The outer end of section 13 is formed axially thereof with an opening 28 surrounded by a peripherally threaded collar 29 integral with the outer face of the outer end of section 13. The outer end of the latter is also formed with a pair of spaced openings 30, 31 arranged equi-distant from the sides of collar 29. The purpose of openings 30, 31 will be presently referred to. The inner end of sleeve 21 has arranged in opposed spaced relation thereto a hollow conoidal-shaped cap 32 constituting a retarder. The base of cap 32 is of greater diameter than and is disposed laterally in all directions with respect to the inner end of sleeve 21. The cap 32 has secured to its inner face a series of spaced arms 33 which are anchored to the other periphery of sleeve 21 at the inner end of the latter whereby cap 32 is suspended in spaced relation relative to the sleeve. The opening 28 constitutes an intake for chamber 15. The sleeve 21 provides an outlet for chamber 15 and has entrance to its inner end restricted by cap 32.

Suspended within housing section 13, in close proximity to its inner end, is a hollow dome-shaped upstanding baffle or deflector 34 having its convex side opposing in spaced relation the curved inner face of the closed end of said housing section 13. The axis of the deflector 34 aligns with the transverse axis of the housing. Formed integral with or anchored to the convex side of deflector 34 is a pair of spaced parallel hangers 35, 36 which extend towards the openings 30, 31 respectively. The outer ends of hangers 35, 36 are provided with screw threaded sockets 37, 38 respectively, for the reception of headed clamping bolts 39, 40 respectively extending through the opening 30, 31 respectively for clamping the hangers against the inner face of the outer end of housing section 13. The edge of the deflector 34 is spaced throughout from the inner face of the inner portion of housing section 13.

The lines 8, 8' are constructed from any suitable material and form elements of the adapter. The line 8 is secured to the collar 29 by the interiorly threaded, flanged coupler 41 and is provided with the throttle valve 10. The line 8' is of greater diameter than the line 8 and is secured to the outer portion 25 of the sleeve 21 by an internally threaded flanged coupler 42. The coupler 41 has threaded engagement with the threads of collar 29. The threads of coupler 42 engage with the threads 27'. The line 8' is provided with the air inlet means 11 and also with a closure valve 43. The throttle valve 10, means 11 and valve 43 are operated in unison by the link 12 connected to a crank 44 on shaft 45 for valve 10, a lever 46 on shaft 47 for valve 43 and the throttle control 9' connected to crank 44 and lever 46. The shifting part 48 of means 11 is carried by lever 46. The part 48 opens and closes the openings 49 in the line 8'.

Propane gas, when stored under pressure, liquefies and forms its own pressure varying according to atmospheric conditions, generally about 120 to 150 pounds per square inch. This pressure brings the liquefied gas to the valve 10. When the latter is open the liquefied gas passes into the chamber 15 against the baffle or deflector 34. As the gas strikes the baffle 34 it expands to its natural gaseous state, passes into sleeve 21 where it is admixed with air entering through the controlled openings 49 and then passes into the cylinder of the engine and combusts. The greater the pressure of the gas mixture, the greater is the R. P. M. attained by the engine connected with the intake manifold 7. The air inlet means is simultaneously opened with the opening of the throttle valve for the purpose of insuring a satisfactory gas and air mixture.

What I claim is:

A gas mixer comprising a housing forming an expansion chamber for the gas having a gas intake and a gas outlet, said housing being of dome-shaped contour on the gas intake end and of pear-shaped contour on the gas outlet end, a baffle suspended in said chamber between said intake and outlet and positioned in the path of the incoming gas, said baffle being spaced throughout from the walls of said chamber having a curvature conforming to the dome shape of the housing having its convex side adjacent said gas intake and serving to direct the gas smoothly along the outline of the housing towards the gas outlet, said outlet being provided with a controllable air intake supplying air to the expanded gas, controlling means for said air intake, a controlling valve for said gas intake, and means connected with said valve and controlling means for opening and closing said valve and air intake in unison.

PRESTON N. JARBOE.